United States Patent
Suzuki et al.

(10) Patent No.: US 10,403,862 B2
(45) Date of Patent: Sep. 3, 2019

(54) BATTERY

(71) Applicants: Satoshi Suzuki, Toyota (JP); Hiroyuki Nakayama, Toyota (JP); Toshiya Okada, Toyota (JP)

(72) Inventors: Satoshi Suzuki, Toyota (JP); Hiroyuki Nakayama, Toyota (JP); Toshiya Okada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 101 days.

(21) Appl. No.: 14/410,193

(22) PCT Filed: Feb. 20, 2013

(86) PCT No.: PCT/JP2013/054100
§ 371 (c)(1),
(2) Date: Dec. 22, 2014

(87) PCT Pub. No.: WO2014/002523
PCT Pub. Date: Jan. 3, 2014

(65) Prior Publication Data
US 2015/0372261 A1    Dec. 24, 2015

(30) Foreign Application Priority Data
Jun. 27, 2012 (JP) ................................. 2012-144229

(51) Int. Cl.
*H01M 2/02* (2006.01)
*H01M 2/06* (2006.01)
(Continued)

(52) U.S. Cl.
CPC ........... *H01M 2/0217* (2013.01); *B23K 26/24* (2013.01); *H01M 2/024* (2013.01);
(Continued)

(58) Field of Classification Search
CPC ............ H01M 2/0217; H01M 2/0247; H01M 2/0426; H01M 2/0439
See application file for complete search history.

(56) References Cited

U.S. PATENT DOCUMENTS

| 6,573,000 B1 | 6/2003 | Miyazaki et al. |
| 8,017,267 B2 * | 9/2011 | Yoshida ............... H01M 2/0426 429/163 |
| 2013/0171510 A1 | 7/2013 | Tsutsumi |

FOREIGN PATENT DOCUMENTS

| JP | H11-213967 A | 8/1999 |
| JP | 2000-268781 A | 9/2000 |
| WO | 2012/043578 A1 | 4/2012 |

* cited by examiner

Primary Examiner — Ula C Ruddock
Assistant Examiner — Thomas H. Parsons
(74) Attorney, Agent, or Firm — Hunton Andrews Kurth LLP

(57) ABSTRACT

This battery is provided with a power generating element, a battery case main body, a battery case lid, an electrode terminal member which is connected electrically to the power generating element inside of the battery case body and which extends outside of the battery case lid, and an outer insulation member which is arranged on the battery case lid and insulates the electrode terminal member from the battery case lid. The battery case lid is fitted inside of the opening and welded to the battery case main body by irradiating a laser from above the battery case lid towards the boundary section between the battery case lid and the battery case main body. Furthermore, this battery is provided with a plume control portion which prevents the plume that rises from the boundary portion during welding from rising towards the outer insulating member.

1 Claim, 12 Drawing Sheets

(51) Int. Cl.
  *H01M 2/04* (2006.01)
  *B23K 26/24* (2014.01)
  *H01M 2/30* (2006.01)
  *H01M 10/04* (2006.01)
(52) U.S. Cl.
  CPC ....... *H01M 2/0426* (2013.01); *H01M 2/0439* (2013.01); *H01M 2/06* (2013.01); *H01M 2/30* (2013.01); *H01M 10/0431* (2013.01)

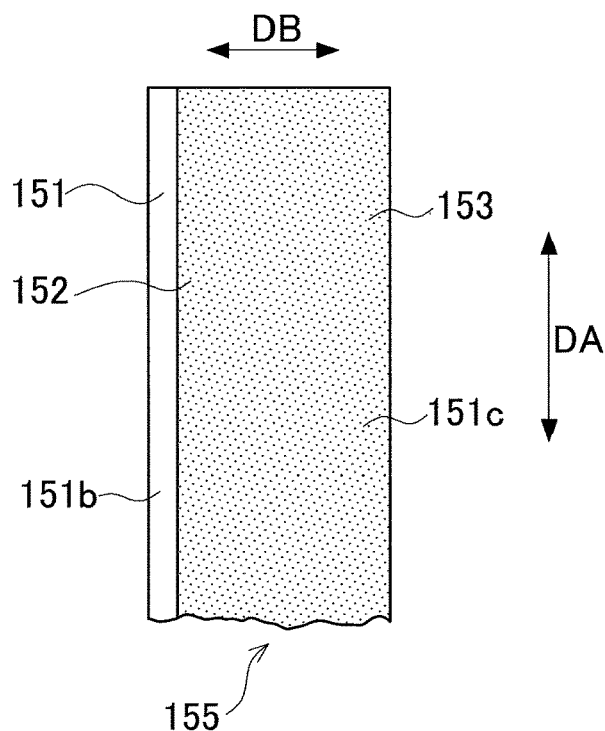
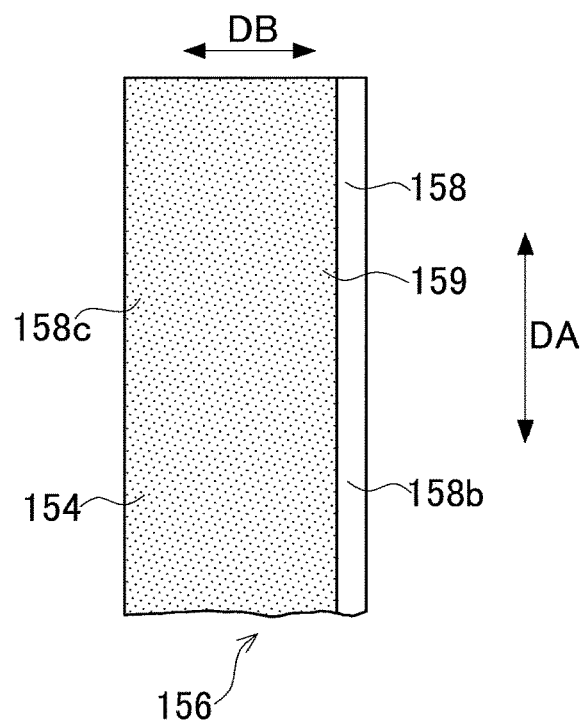

BATTERY

CROSS-REFERENCE TO RELATED APPLICATIONS

This is a US national phase application based on the PCT International Patent Application No. PCT/JP2013/054100 filed on Feb. 20, 2013, and claiming the priority of Japanese Patent Application No. 2012-144229 filed on Jun. 27, 2012, the entire contents of which are herewith incorporated by reference.

TECHNICAL FIELD

The present invention relates to a battery with a case lid welded to a case body internally housing a power generating element.

BACKGROUND ART

In recent years, batteries such as lithium ion secondary batteries are used in various fields, for example, electronic devices such as a mobile phone and a personal computer, vehicles such as a hybrid vehicle and an electric vehicle. In particular, the lithium ion secondary batteries provide high energy density and thus are suitably mounted in various devices.

The lithium ion secondary battery is for example configured such that a power generating element is housed in a rectangular battery case. This power generating element is for example formed in a flat wound shape including a positive electrode sheet having positive coated layers containing positive active material, a negative electrode sheet having negative coated layers containing negative active material, and separators insulating them. The battery case is provided with a case body having an opening on an upper side to house the power generating element, and a case lid closing the opening of the case body.

The case lid is fitted in the opening of the case body and welded thereto. This welding is performed for example by laser welding using a CW laser in such a manner that a laser beam is irradiated from above the battery case to an upper surface thereof by vertical-shooting case-sealing welding. A welded zone in the battery case is a boundary appearing on the upper surface of the battery case between the case body and the case lid. This boundary is an annular area formed inside the peripheral edge of the upper surface of the battery case. When the CW laser is irradiated to the boundary, a plume rises up, or blows out, from the boundary in a nearly vertical direction. The plume is a vaporized metal rising like smoke or fume and mainly composed of Ar (Argon) vapor and plasma. During laser welding, a shield gas is made to flow along the boundary in order to prevent the plume from greatly fluctuating or deflecting in an inside-outside direction of the battery case, that is, in order to allow the plume to stably rise up from the battery case in the nearly vertical direction.

Herein, the case lid is attached with electrode terminal members (a positive terminal member and a negative terminal member) electrically connected to the power generating element. The positive terminal member connected to the positive electrode sheet of the power generating element is identical in structure to the negative terminal member connected to the negative electrode sheet of the power generating element. The electrode terminal members each include an element connecting terminal (a positive connecting terminal, a negative connecting terminal) and an outer connecting terminal. Each element connecting terminal (a positive connecting terminal, a negative connecting terminal) has an insert-through part inserted through a through hole formed in the case lid and is electrically connected to the power generating element. Each outer connecting terminal is for example a Z terminal of a nearly Z-shape in side view in a longitudinal direction of the rectangular battery case (hereinafter, simply referred to as a "longitudinal direction") and is electrically connected to the element connecting terminal outside the case lid. Insulators are provided between each outer connecting terminal and the case lid. The insulators are insulating members made of synthetic resin and used to insulate the outer connecting terminals from the case lid. Furthermore, gaskets are provided between each outer connecting terminal and the case lid. The gaskets are used to seal a gap between each element connecting terminal and the case lid and also to insulate between them. Assembling the electrode terminal members and others to the case lid is performed by sequentially inserting the gaskets, the case lid, the insulators, and the outer connecting terminals onto the corresponding insert-through parts of the element connecting terminals and then deforming, or riveting, a distal end portion of each insert-through part.

The width of the insulator provided in the battery (the width in a short side direction of the rectangular battery case) is slightly smaller than the width of the rectangular battery case itself in the short side direction. Accordingly, the separation distance from the outer peripheral surface of each insulator in a longitudinal direction to the boundary portion of the battery case is short. Thus, a flow path of a shield gas G is small in vertical cross section as shown in FIG. 17, resulting in an insufficient flow along a boundary portion K.

In some cases, therefore, a plume F would largely fluctuate in the inside-outside direction of a battery case 110. If the plume F largely fluctuates toward the inside of the battery case 110, the high-temperature plume F may touch and hence burn an insulator 180. If the insulator 180 is burned, the insulation property of the insulator 180 deteriorates, causing a defect that could not insulate between an outer connecting terminal 137 and a case lid 113.

Meanwhile, there is known a battery disclosed in Patent Document 1 listed below as a battery including a case body and a case lid welded to each other by a laser beam irradiated from above a battery case toward an upper surface thereof. In the battery disclosed in Patent Document 1 listed below, as shown in FIGS. 1 and 2 and paragraphs 0030 to 0032, a groove 311 is formed along the outer periphery of a case lid (a sealing plate 31), thereby forming a stepped part 312 in the inner surface of the groove 311, the stepped part 312 having a height lower in a section close to the center than in a section close to the outer periphery. The presence of this stepped part 312 eliminates a direct heat transfer path from a molten pool 60 toward the center of the sealing plate 31 along the surface of the sealing plate 31. Accordingly, it is possible to suppress dissipation of heat from the molten pool 60 to the center of the sealing plate 31 during laser sealing, thereby reducing thermal damages to an insulating member (a gasket 33) and other members located around a weld zone.

RELATED ART DOCUMENTS

Patent Documents

Patent Document 1: JP-A-2000-268781

SUMMARY OF INVENTION

Problems to be Solved by the Invention

However, the technique disclosed in Patent Document 1 does not consider any plume rising from the upper surface of the battery case during welding between the case body (an outer can 10) and the case lid (the sealing plate 31). Therefore, the plume generated during welding may burn the insulating member (the gasket 33) interposed between the electrode terminal member (a negative terminal 32) and the case lid (the sealing plate 31), resulting in deterioration of the insulation property of the insulating member.

The present invention has been made to solve the above problems and has a purpose to provide a battery configured to enable preventing burning of an insulating member by plume during laser welding of a case lid to a case body.

Means of Solving the Problems

To achieve the above purpose, one aspect of the invention provides a battery including: a power generating element; a case body having an upper opening and housing the power generating element; a case lid closing the opening of the case body; an electrode terminal member electrically connected to the power generating element inside the case body and extending out of the case lid; and an outer insulating member placed on the case lid and configured to insulate between the electrode terminal member and the case lid, the case lid being fitted in the opening and welded to the case body by laser irradiation from above the case lid toward a boundary portion between the case lid and the case body, wherein the battery further includes a plume restricting zone configured to prevent a plume which rises from the boundary portion during welding from rising toward the outer insulating member. The "power generating element" may be selected for example from a wound power generating element including a long positive electrode, a long negative electrode, and separators, which are overlapped one on another and wound together, a laminated power generating element including a plurality of positive electrodes, a plurality of negative electrodes, and a plurality of separators, each having a predetermined shape, laminated or stacked one on another, and others.

According to the battery configured as above, the plume restricting zone restricts a plume from rising toward the outer insulating member. Therefore, during welding of the case lid to the case body, it is possible to prevent the outer insulating member from becoming burned by the plume. Thus, the outer insulating member can keep good insulating property.

In the aforementioned battery, preferably, the opening has a rectangular shape including a pair of long side portions and a pair of short side portions, the case lid and the outer insulating member are configured to form a space along each of the long side portions so that the space extends more inward than an upper part of an outer-peripheral side surface of the outer insulating member, the outer-peripheral side surface extending along the long side portion, and the space constitutes the plume restricting zone.

According to the above configuration, the space defined by the case lid and the outer insulating member can be utilized as a flow path of a shield gas. This can provide a large cross sectional area of the shield gas path and allows a sufficient amount of the shield gas to flow along the long side portion of the case body. When a sufficient amount of the shield gas is made to flow, the plume less fluctuates in the inside-outside direction. This can prevent the plume from rising toward the outer insulating member.

In the aforementioned battery, preferably, the space is recessed more downward than an upper surface of an outer peripheral edge portion of the case lid.

According to the above configuration, the space utilizable as a flow path of a shield gas can be made wider. Thus, the shield gas path having a larger cross sectional area allows a more sufficient amount of shield gas to flow along the long side portion of the case body. This enables the shield gas to flow by a sufficient amount, thereby reducing fluctuation or deflection of the plume in the inside-outside direction and further reliably preventing the plume from rising toward the insulator.

Furthermore, the aforementioned battery may be configured such that the opening has a rectangular shape including a pair of long side portions and a pair of short side portions, the case body includes a pair of first side walls having the long side portions and a pair of second side walls having the short side portions, at least upper portions of parts of the first side walls between which the outer insulating member is placed are formed as thin wall portions thinner than other portions, and the thin wall portions constitute the plume restricting zone.

According to the above configuration, the heat capacity of the thin wall portion of each first side wall is lower than the heat capacity of the other portions, so that the thin wall portion is melted more than the other portions during welding. Thus, since the boundary portion of the case body is melted more than the boundary portion of the case lid, a weld bead is formed more downward in the thin wall portion. Specifically, in a vertical cross section taken along the short side portion, a line joining the center point of a circular arc defining the upper surface of the weld bead and the center of a sector, or a fan shape, defined by the circular arc is inclined to the outside of the battery case with respect to the vertical direction. Herein, a plume rises along this line joining the center point of the circular arc defining the upper surface of the weld bead and the center of the sector defined by the circular arc. Accordingly, when this line joining the center point of the circular arc defining the upper surface of the weld bead and the center of the sector formed by the circular arc is tilted toward the outside of the battery case with respect to the vertical direction, the plume will rise in an orientation tilting toward the outside the case body. Thus, it is possible to separate the plume from the outer insulating member placed on the case lid. This enables preventing the outer insulating member from becoming burned and further avoiding a decrease in insulation property of the outer insulating member.

Effects of the Invention

According to the above configuration, it is possible to prevent an insulating member from becoming burned by a plume during laser welding of a case lid to a case body.

BRIEF DESCRIPTION OF THE DRAWINGS

FIG. 4 is a diagram showing a positive electrode sheet of the electrode body in the first embodiment;

FIG. 5 is a diagram showing a negative electrode sheet of the electrode body in the first embodiment;

MODE FOR CARRYING OUT THE INVENTION

First Embodiment

Figure 1:
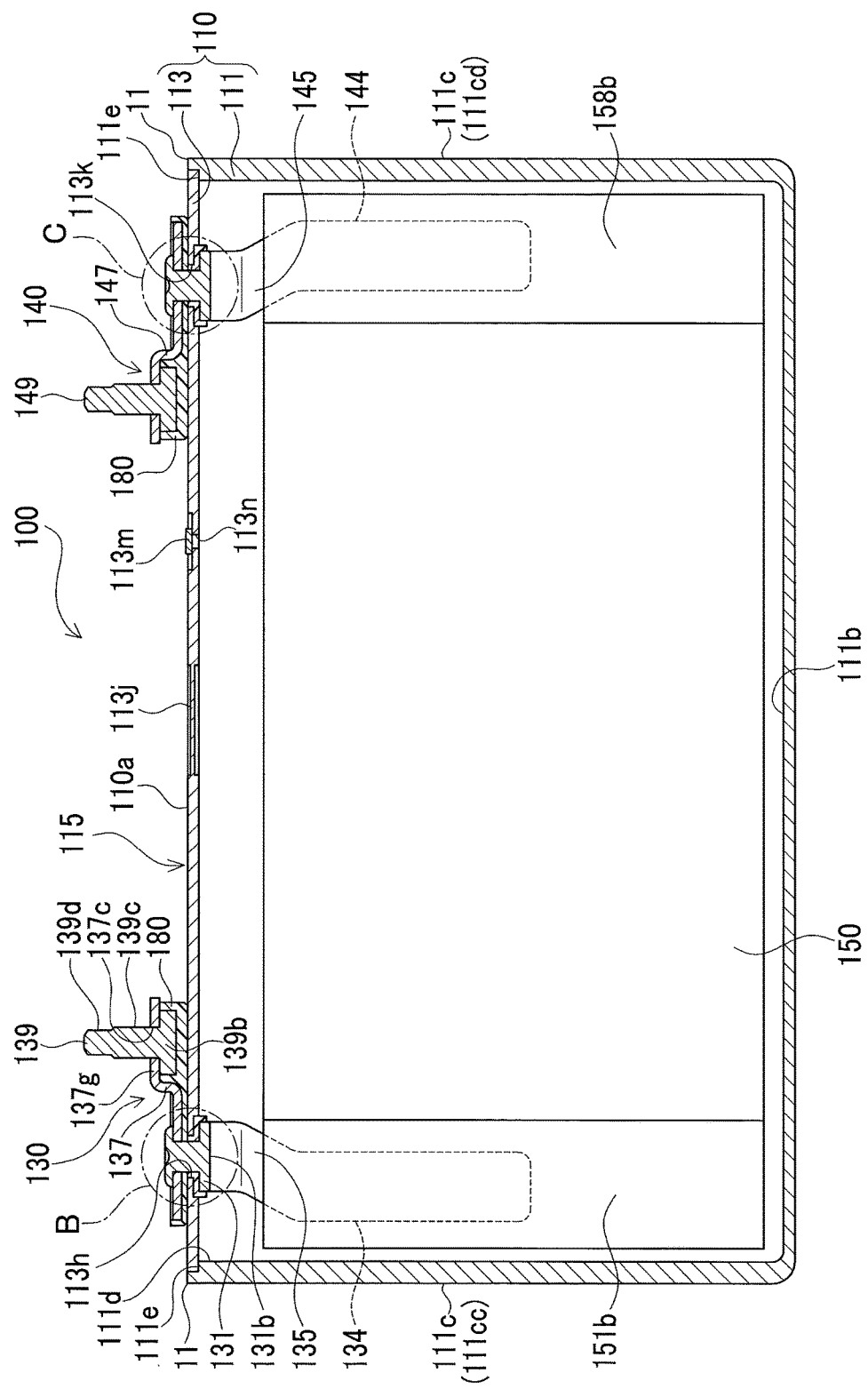
FIG. 1 is a cross sectional view of a battery in a first embodiment.

A detailed description of a preferred embodiment of the present invention will now be given referring to the accompanying drawings. FIG. 1 is a cross sectional view of a battery 100 in a first embodiment. The battery 100 in the first embodiment is, as shown in FIG. 1, a rectangular lithium ion secondary battery that includes a rectangular case 110 and an electrode body (corresponding to a power generating element) 150 housed in the battery case 110. This battery 100 will be mounted in vehicles such as a hybrid vehicle and an electric vehicle or in battery using devices such as a hammer drill. In the present description, unless otherwise noted, left, right, upper, and lower sides are defined with reference to FIG. 1 and a near side in a drawing sheet of FIG. 1 is assumed as a front side and a far side in the drawing sheet is assumed as a rear side.

1. Electrode Body

Figure 2:
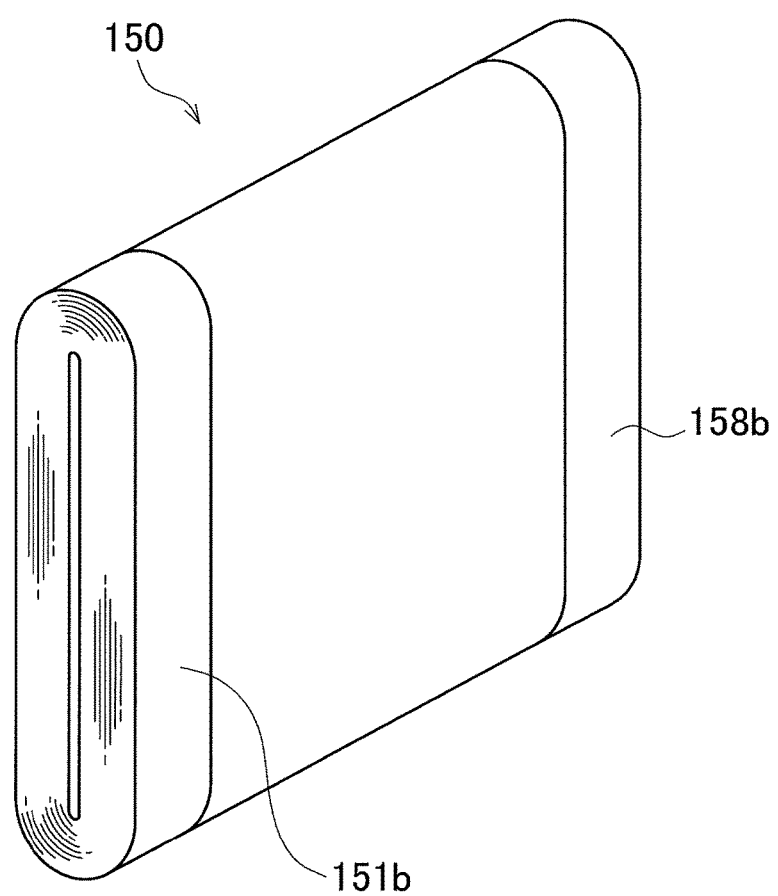
FIG. 2 is a perspective view of an electrode body provided in the battery in the first embodiment.
Figure 3:
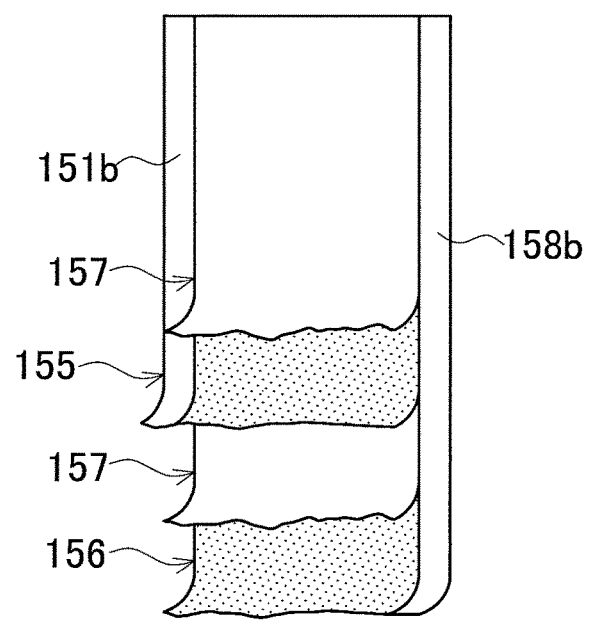
FIG. 3 is a diagram showing a structure of the electrode body in the first embodiment.

The electrode body 150 will be explained with reference to FIGS. 2 to 5. This electrode body 150 is a wound electrode body of a flattened shape including a strip-shaped positive electrode sheet 155, a strip-shaped negative electrode sheet 156, and separators 157, wound together as shown in FIGS. 2 and 3.

The positive electrode sheet 155 includes a strip-shaped positive substrate 151 formed of an aluminum foil extending in a longitudinal direction DA, and positive mixture layers 152 each placed on part of each surface of the substrate 151 as shown in FIG. 4. The positive mixture layer 152 contains positive active material 153, electrically conductive material made of acetylene black, and PVDF (binder).

Of the positive substrate 151, a portion coated with the positive mixture layers 152 is referred to as a positive mixture layer coated portion 151c, while a portion not coated with the positive mixture layers 152 is referred to as a positive mixture layer uncoated portion 151b. This uncoated portion 151b is located at one end (a left end in FIG. 4) of the substrate 151 (the positive electrode sheet 155) in a width direction DB (a right-left, or lateral, direction in FIG. 4) and extends along one long side of the substrate 151 (the positive electrode sheet 155) in a strip shape extending in the longitudinal direction DA (an up-down, or vertical, direction in FIG. 4) of the substrate 151 (the positive electrode sheet 155).

The negative electrode sheet 156 includes a strip-shaped negative substrate 158 formed of a copper foil extending in the longitudinal direction DA, and negative mixture layers 159 each placed on part of each surface of the substrate 158 as shown in FIG. 5. The negative mixture layer 159 contains negative active material 154, SBR (binder), and CMC (thickener).

Of the negative substrate 158, a portion coated with the negative mixture layers 159 is referred to as a negative mixture layer coated portion 158c, while a portion uncoated with the negative mixture layers 159 is referred to as a negative mixture layer uncoated portion 158b. This uncoated portion 158b is located at one end (a right end in FIG. 5) of the substrate 158 (the negative electrode sheet 156) in the width direction DB (a right-left direction in FIG. 5) and extends along one long side of the substrate 158 (negative electrode sheet 156) in a strip shape extending in the longitudinal direction DA (an up-down direction in FIG. 5) of the substrate 158 (negative electrode sheet 156).

2. Battery Case

Figure 6:
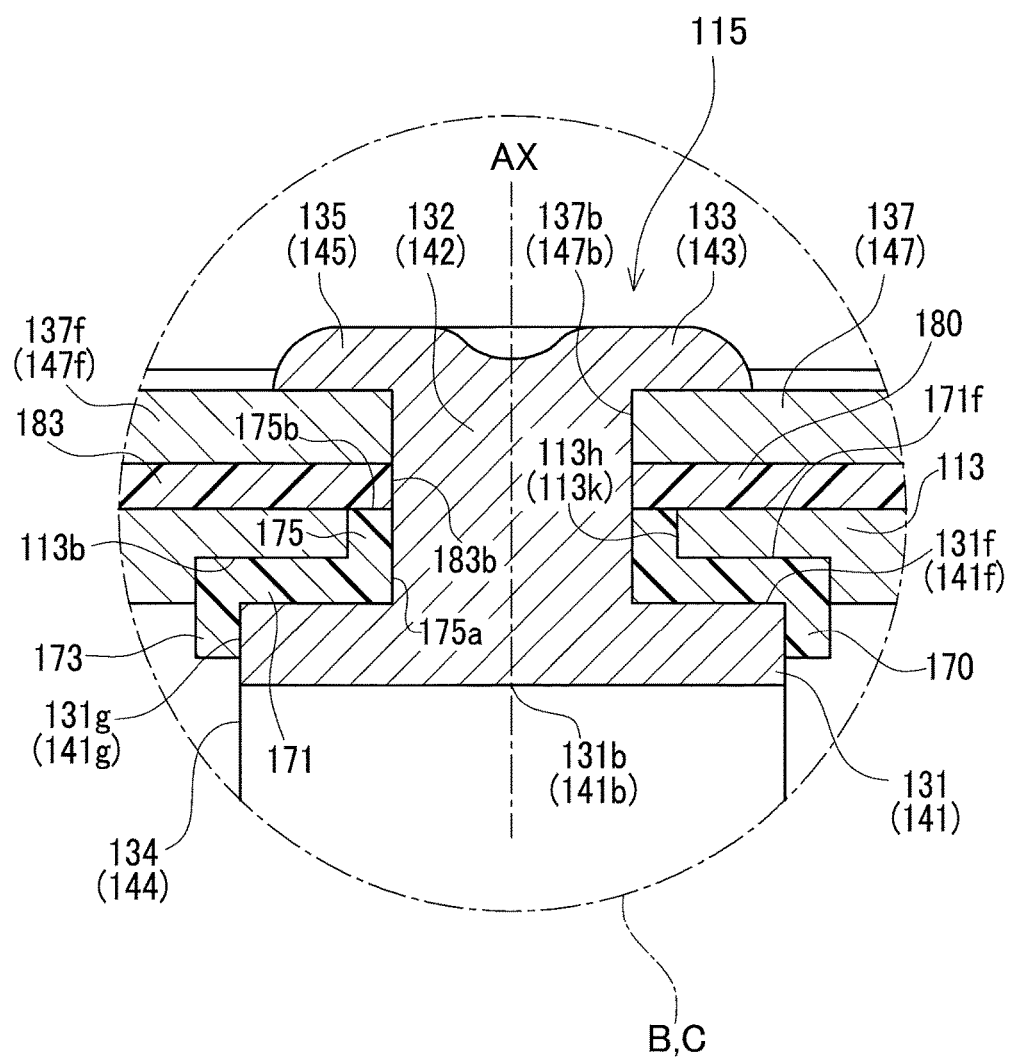
FIG. 6 is an enlarged view of a section B and a section C in FIG. 1.
Figure 7:
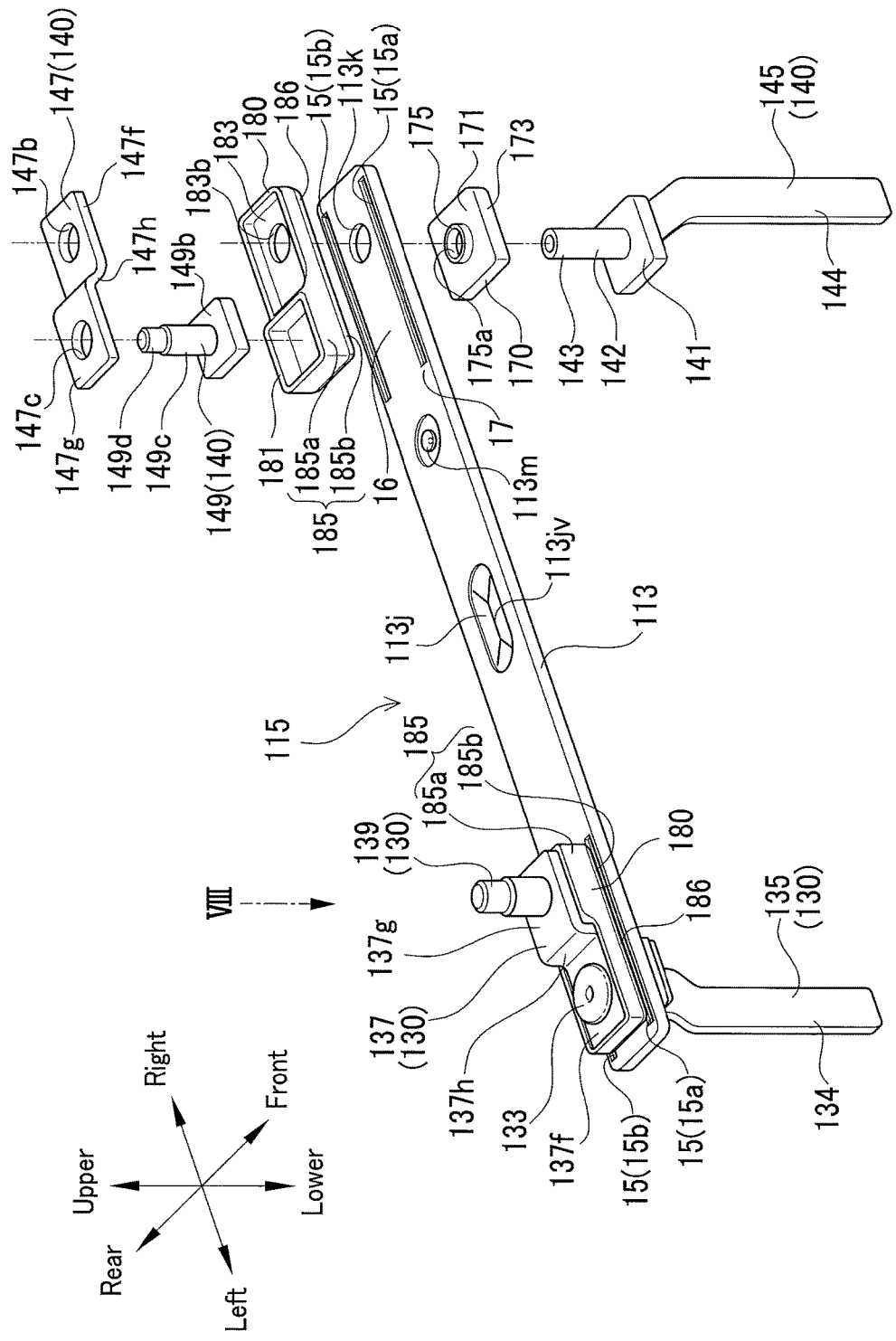
FIG. 7 is a view showing a terminal-attached lid member in the first embodiment.
Figure 8:
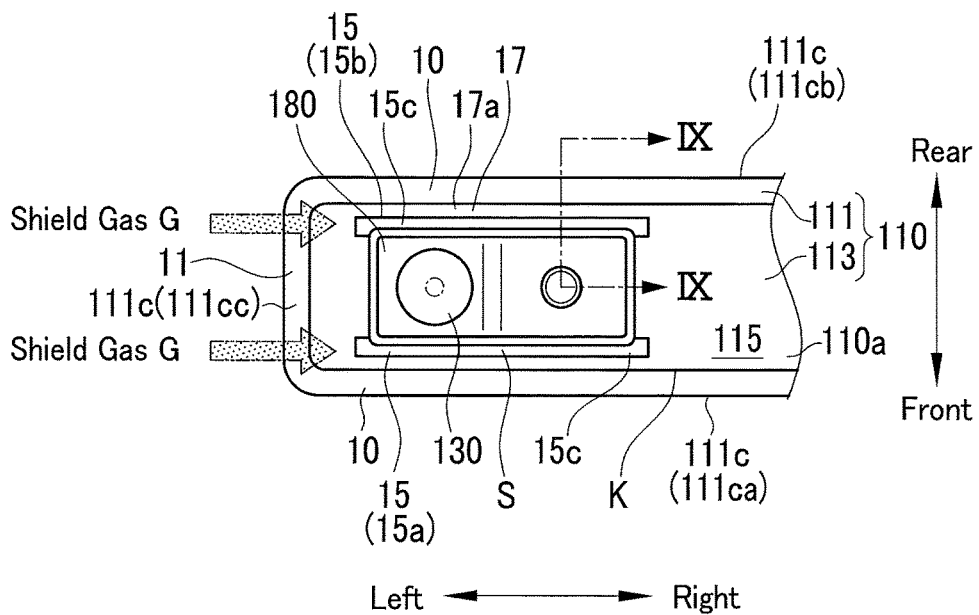
FIG. 8 is a view seen along an arrow VIII in FIG. 7.

The battery case will be explained referring to FIGS. 1 and 6-8. FIG. 6 is an enlarged view of a section B and a section C in FIG. 1. In FIG. 6, different parts or components in the section C from those in the section B are given parenthetic reference signs. FIG. 7 is an exploded perspective view of part of a terminal-attached lid member 115 in the first embodiment. FIG. 8 is a view seen along an arrow VIII in FIG. 7.

The battery case 110 includes, as shown in FIG. 1, a rectangular box-shaped case body 111 having an opening 111d and a plate-shaped case lid 113 closing the opening 111d of the case body 111. The battery case 110 is made of metal (concretely, pure aluminum). The case body 111 houses the electrode body 150. The case lid 113 is joined to the case body 111 by welding.

2-1. Case Body

The case body 111 has a bottom-closed box shape having the opening 111d on an upper side to house the electrode body 150. The opening 111d has a nearly rectangular shape in plan view, which is defined by a pair of long side portions 10 (see FIG. 8) extending in a longitudinal direction (a right-left direction) and a pair of short side portions 11 extending in a short side direction (a rear-front direction).

The case body 111 includes a rectangular plate-like bottom wall 111b opposed to the case lid 113, four side walls 111c vertically extending upward from the peripheral edge of the bottom wall 111b. The side wall 111c consists of a front wall 111ca and a rear wall 111cb (see FIG. 8) each extending in the longitudinal direction (i.e., the right-left direction) of the battery case 100 in plan view and a left wall 111cc and a right wall 111cd (see FIG. 1) each extending in the short side direction (i.e., the rear-front direction) of the battery case 100 in plan view. The front wall 111ca and the rear wall 111cd are opposed to each other. Upper parts of these front wall 111ca and rear wall 111cb are the pair of long side portions 10 (see FIG. 8). These front wall 111ca and rear wall 111cb correspond to a pair of first side walls. The left wall 111cc and the right wall 111cd are opposed to each other. Upper parts of these left wall 111cc and right wall 111cd are the pair of short side portions 11 (see FIG. 1). These left wall 111cc and right wall 111cd correspond to a pair of second side walls.

As shown in FIG. 1, the upper part of the left wall 111cc has an upper surface on an inner peripheral side lower than an upper surface on an outer peripheral side. Specifically, the upper part of the left wall 111cc is formed with a stepped portion 111e. The upper part of the right wall 111cd is also formed with a stepped portion 111e. These stepped portions 111e serve to support, by their upper surfaces, right and left ends of the case lid 113 when the case lid 113 is fitted in the opening 111d of the case body 111.

2-2. Case Lid (Terminal-Attached Lid Member)

The case lid 113 has a rectangular plate-like shape and is formed with circular through holes 113h, 113k each penetrating through the case lid 113 in positions near both ends in a longitudinal direction (the right-left direction). The case lid 113 is further provided, at its center in the longitudinal direction, with a safety valve 113j. This safety valve 113j is formed integral with the case lid 113 to constitute a part of the case lid 113.

The safety valve 113j is formed to be thinner than other portions of the case lid 113 and also is formed, on its upper surface, with a groove 113jv (see FIG. 7). Accordingly, the safety valve 113j operates when the internal pressure of the battery case 110 reaches a predetermined pressure. Specifically, the groove 113jv ruptures when the internal pressure reaches the predetermined pressure, thereby allowing gas in the battery case 110 to release out.

The case lid 113 is formed, between the safety valve 113j and the through hole 113k, with a liquid inlet 113n (see FIG. 1) through which electrolyte (not shown) is poured into the battery case 110. In the completed battery 100, this liquid inlet 113n is sealed with a plug 113m.

The battery 100 further includes electrode terminal members (a positive terminal member 130 and a negative terminal member 140) each of which is connected to the electrode body 150 inside the case body 111 and extends out through respective through holes 113h and 113k of the case lid 113.

The positive terminal member 130 consists of a positive connecting member (an element connecting terminal) 135, a positive outer terminal member (an outer connecting terminal) 137, and a positive fastening member (a bolt) 139 (see FIGS. 1 and 7). The connecting member 135 is made of metal (pure aluminum), and is connected to the electrode body 150 and extends out through the through hole 113h of the case lid 113. The outer terminal member 137 is made of metal, and is located on the case lid 113, that is, outside the battery case 110, and is electrically connected to the connecting member 135 outside the battery case 110. The fastening member 139 is made of metal, and is located on the case lid 113, that is, outside the battery case 110, and is electrically connected to the outer terminal member 137.

To be specific, the positive connecting member 135 includes a seat part 131, an insert-through part 132, an electrode body connecting part 134, and a deformed part 133 (see FIGS. 1, 6, 7). The seat part 131 has a rectangular plate-like shape and is located in the case body 111. The insert-through part 132 has a columnar shape protruding from an upper surface 131f of the seat part 131 and is inserted through the through hole 113h of the case lid 113. The deformed part 133 is a portion continuous with an upper end of the insert-through part 132 and is formed by riveting or caulking, that is, deformed to extend in diameter into a circular disk shape, and thus electrically connected to the positive outer terminal member 137. The electrode body connecting part 134 is shaped to extend from a lower surface 131b of the seat part 131 toward a bottom 111b of the case body 111 and is welded to a positive mixture layer uncoated portion 151b of the electrode body 150. Thus, the positive connecting member 135 and the electrode body 150 are electrically and mechanically connected to each other.

The positive outer terminal member 137 is formed of a metal plate having a nearly Z shape in side view. This terminal member 137 includes a fixed part 137f fixed by the deformed part 133, a connection part 137g connected to the fastening member 139, and a joint part 137h joining the fixed part 137f and the connection part 137g. The fixed part 137f is formed with a through hole 137b penetrating therethrough. In this through hole 137b, the insert-through part 132 of the positive connecting member 135 is inserted. The connection part 137g is also formed with a through hole 137c penetrating therethrough.

The positive fastening member 139 is a metal bolt including a rectangular plate-shaped head portion 139b and a columnar shaft portion 139c. The shaft portion 139c includes a distal end portion formed with screw threads 139d. The shaft portion 139c of the fastening member 139 is inserted in the through hole 137c of the positive outer terminal member 137.

The negative terminal member 140 consists of a negative connecting member (an element connecting terminal) 145, a negative outer terminal member (an outer connecting terminal) 147, and a negative fastening member (a bolt) 149 (see FIGS. 1 and 7). The connecting member 145 is made of metal (pure copper) and is connected to the electrode body 150 and also extends out through the through hole 113k of the case lid 113. The outer terminal member 147 is made of metal and is located on the case lid 113, that is, outside the battery case 110, and is electrically connected to the connecting member 145 outside the battery case 110. The fastening member 149 is made of metal and is located on the case lid 113, that is, outside the battery case 110, and is electrically connected to the outer terminal member 147.

To be concrete, the negative connecting member 145 includes a seat part 141, an insert-through part 142, an electrode body connecting part 144, and a deformed part 143 (see FIGS. 1, 6, 7). The seat part 141 has a rectangular plate-like shape and is located in the case body 111. The insert-through part 142 has a columnar shape protruding from an upper surface 141f of the seat part 141 and is inserted through the through hole 113k of the case lid 113. The deformed part 143 is a portion continuous with an upper end of the insert-through part 142 and is formed by riveting or caulking, that is, deformed to extend in diameter into a circular disk shape, and thus electrically connected to the negative outer terminal member 147. The electrode body connecting part 144 is shaped to extend from a lower surface 141b of the seat part 141 toward the bottom 111b of the case body 111 and is bonded to a negative mixture layer uncoated portion 158b of the electrode body 150. Thus, the negative connecting member 145 and the electrode body 150 are electrically and mechanically connected to each other.

The negative outer terminal member 147 is formed of a metal plate having a nearly Z shape in side view. This terminal member 147 includes a fixed part 147f fixed by the deformed part 143, a connection part 147g connected to the fastening member 149, and a joint part 147h joining the fixed part 147f and the connection part 147g. The fixed part 147f is formed with a through hole 147b penetrating therethrough. In this through hole 147b, the insert-through part 142 of the negative connecting member 145 is inserted. The connection part 147g is also formed with a through hole 147c penetrating therethrough.

The negative fastening member 149 is a metal bolt including a rectangular plate-shaped head portion 149b and a columnar shaft portion 149c. The shaft portion 149c includes a distal end portion formed with screw threads 149d. The shaft portion 149c of the fastening member 149 is inserted in the through hole 147c of the negative outer terminal member 147.

The battery 100 further includes a first insulating member 170 interposed between the positive terminal member 130 (i.e., the positive connecting member 135) and the case lid 113 to electrically insulate them from each other. Another first insulating member 170 is also interposed between the negative terminal member 140 (i.e., the negative connecting member 145) and the case lid 113.

Specifically, the first insulating member 170 is a gasket made of electrically insulating resin (concretely, PFA). This first insulting member 170 includes an insulating interposed part 171, an insulating side wall 173, and an insertion part 175 (see FIGS. 6 and 7). The insulating interposed part 171 has a flat plate-like shape and is interposed between the upper surface 131f (the upper surface 141f) of the seat part 131 (the seat part 141) of the positive terminal member 130 (the negative terminal member 140) and the lower surface (the inner surface) 113b of the case lid 113.

The insulating side wall 173 is a rectangular annular side wall located on an outer peripheral edge of the insulating interposed part 171. This side wall 173 surrounds the outer peripheral surface 131g (the outer peripheral surface 141g) of the seat part 131 (the seat part 141). With the above configuration, the upper surface 131f (the upper surface 141f) of the seat part 131 (the seat part 141) is retained in the lower surface of the first insulating member 170, thereby restraining rotation of the insulating member 170 with respect to the seat part 131 (the seat part 141).

The insertion part 175 has a cylindrical shape that is positioned on the inner peripheral edge (at the center in plan view) of the insulating interposed part 171 and that protrudes upward from an upper surface 171f of the interposed part 171 and is inserted through the through hole 113h (through hole 113k) of the case lid 113. A cylindrical portion of this insertion part 175 is formed with an insert-through hole 175a in which the insert-through part 132 of the positive terminal member 130 (the insert-through part 142 of the negative terminal member 140) is inserted.

The battery 100 further includes a second insulating member (corresponding to an outer insulating member) 180 made of electrically insulating resin (concretely, 100% PPS) and placed on the case lid 113. The second insulating member 180 is also referred to as an insulator. This second insulating member 180 is interposed between the positive terminal member 130 (concretely, the positive outer terminal member 137 and the positive fastening member 139) and the case lid 113 to electrically insulate them from each other. Another second insulating member 180 is also interposed between the negative terminal member 140 (concretely, the negative outer terminal member 147 and the negative fastening member 149) and the case lid 113.

Specifically, each second insulating member 180 includes a head placing part 181 in which a head 139b of the positive fastening member 139 (a head 149b of the negative fastening member 149) is placed, and a fastening placing part 183 in which the fixed part 137f of the positive outer terminal member 137 (the fixed part 147f of the negative outer terminal member 147) is placed. The fastening placing part 183 is formed with a through hole 183b penetrating therethrough. In this through hole 183b, the insert-through part 132 of the positive terminal member 130 (the insert-through part 142 of the negative terminal member 140) is inserted.

In the present embodiment, the terminal-attached lid member 115 (see FIGS. 6 and 7) consists of the case lid 113, the electrode terminal members (the positive terminal member 130 and the negative terminal member 140), the first insulating members 170, 170, and the second insulating members 180, 180. To be concrete, the positive outer terminal member 137, the second insulating member 180, the case lid 113, and the first insulating member 170 are fixedly clamped between the deformed part 133 and the seat part 131 of the positive terminal member 130, while the negative outer terminal member 147, the second insulating member 180, the case lid 113, and the first insulating member 170 are fixedly clamped between the deformed part 143 and the seat part 141 of the negative terminal member 140. This assembly integrally constitutes the terminal-attached lid member 115.

In the terminal-attached lid member 115, the insulating interposed part 171 of the first insulating member 170 is held between the upper surface 131f (the upper surface 141f) of the seat part 131 (the seat part 141) of the positive terminal member 130 (the negative terminal member 140) and the lower surface (the inner surface) 113b of the case lid 113 so that the insulating interposed part 171 is placed in an elastically compressed state in its own thickness direction (the axial direction AX in FIG. 6). Furthermore, the insertion part 175 of the first insulating member 170 is elastically compressed in its own axial direction (the axial direction AX in FIG. 6) so that a distal end 175b of the insertion part 175 is in close contact with the second insulating member 180. In the above manner, the first insulating members 170 seal the through holes 113h, 113k of the case lid 113.

Figure 9:
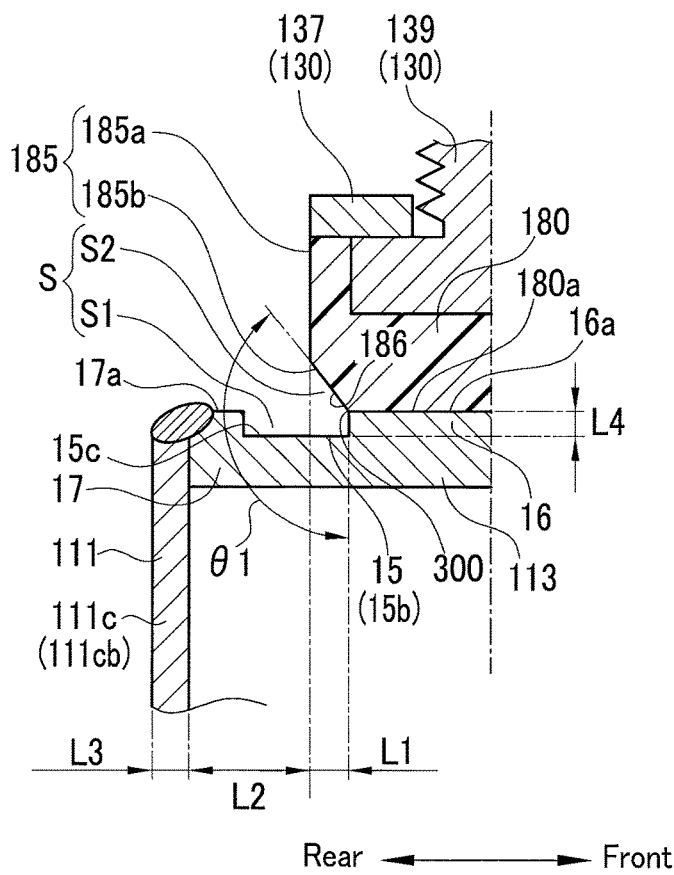
FIG. 9 is cross sectional view taken along IX-IX in FIG. 8.

Next, the details of the second insulating member 180 and the case lid 113 will be further explained referring to FIGS. 7 to 9. FIG. 9 is a cross sectional view taken along IX-IX in FIG. 8. The following explanation is made on the second insulating member 180 provided for the positive terminal member 130. The second insulating member 180 provided for the negative terminal member 140 is identical to the second insulating member 180 provided for the positive terminal member 130 and thus is not explained herein.

In the second insulating member 180, side surfaces 185 extending in the longitudinal direction (the right-left direction) of the case lid 113 each include a lower part cut out, or chamfered inward. Specifically, each of the side surfaces 185 of the second insulating member 180 consists of a vertical surface portion 185a extending in the vertical direction and an inclined surface portion 185b inclining inward from the lower end of the vertical surface portion 185a as shown in FIGS. 7 to 9. The lower part of each side surface 185 of the second insulating member 180 including the inclined surface portion 185b is referred to as an escape section 186 (or a cutout 186). The escape section 186 is formed all over the lower part of the side surface 185 of the second insulating member 180. Further, the escape sections 186 are identically formed in the lower parts of the side surfaces 185 on the front side and the rear side of the second insulating member 180. An inclination angle θ1 of the inclined surface portion 185b with respect to the vertical surface in FIG. 9 is about 135° in the present embodiment. A separation distance L1 (see FIG. 9) from an upper edge to a lower edge of the inclined surface portion 185b in the rear-front direction is about 0.3 mm in the present embodiment. In the present embodiment, furthermore, a separation distance L2 from the side surface 185 of the second insulating member 180 to the outer peripheral surface of the case lid 113 in the rear-front direction is three times a thickness L3 of the rear wall 111cb of the case body 111.

On the other hand, the case lid 113 includes four recesses 15 on the upper surface. Each recess 15 extends in the longitudinal direction (the right-left direction) of the case lid 113. The recesses 15 are formed inside the outer peripheral edge of the case lid 113. Furthermore, the recesses 15 are formed on both sides, i.e., a front edge side and a rear edge side, of the case lid 113 and on both ends, i.e., a left end portion of the case lid 113 on which the positive terminal member 130 is provided and a right end portion of the same on which the negative terminal member 140 is provided. The length of each recess 15 in the right-left direction is slightly longer than the length of the second insulating member 180 in the right-left direction. The front recess 15a formed on the front edge side and the rear recess 15b formed on the rear edge side are equal in length in the right-left direction. A left end of the front recess 15a and a left end of the rear recess 15b are aligned in the rear-front direction and a right end of the front recess 15a and a right end of the rear recess 15b are aligned in the rear-front direction. In the case lid 113, the second insulating member 180 is placed in a region interposed between the front recess 15a and the rear recess 15b. In other words, the case lid 113 includes a mounting area 16 (see FIG. 7) on which the second insulating member 180 is mounted. A bottom 180a of the second insulating member 180 is in contact with an upper surface 16a of the mounting area 16. L4 in FIG. 9 denotes a separation distance from a bottom 15c of the recess 15 to an upper surface 17a of the outer peripheral edge portion 17 of the case lid 113. In the present embodiment, L4 is about 0.25 mm.

When the components including the second insulating members 180 are each attached to the case lid 113 configured as above, constituting the terminal-attached lid member 115, a space S is generated by each insulating member 180 and the case lid 113 as shown in FIG. 9. The space S is a clearance defined by a combination of an inner space S1 in the recess 15 formed in the case lid 113 (a space S1 recessed more downward than the upper surface 17a of the outer peripheral edge portion 17 of the case lid 113) and a space S2 formed between the case lid 113 and the escape section 186 (the inclined surface portion 185b) provided in the second insulating member 180 (a space S2 recessed more inward than the upper part of the outer-peripheral side surface 185 extending in the longitudinal direction of the second insulating member 180). That is, the space S is a clearance defined by the lower part, hollowed inward and downward, of the side surface 185 of the second insulating member 180 as shown in FIG. 7. This space S forms a flow path of the shield gas G which will be caused to flow during welding as mentioned later.

3. Battery Manufacturing Process

Next, a process of manufacturing the battery 100 in the first embodiment will be explained. Firstly, the electrode body 150, the case body 111, and the terminal-attached lid member 115 configured as above are prepared (produced).

The electrode body connecting part 134 of the positive connecting member 135 is welded to the positive mixture layer uncoated portion 151b of the electrode body 150. Similarly, the electrode body connecting part 144 of the negative connecting member 145 is welded to the negative mixture layer uncoated portion 158b of the electrode body 150. Accordingly, the positive terminal member 130 is electrically connected to the positive electrode sheet 155 (see FIG. 3), the negative terminal member 140 is electrically connected to the negative electrode sheet 156 (see FIG. 3), and also the terminal-attached lid member 115 is made integral with the electrode body 150.

Subsequently, the electrode body 150 is put in the case body 111 and then the opening 111d of the case body 111 is closed with the case lid 113. The case lid 113 and the case body 111 are joined to each other by welding over the entire circumference. An area to be joined by welding is a boundary portion (a seam), indicated by an alphabet K in FIG. 8, between the case lid 113 and the case body 111. Hereinafter, the boundary portion K is also called a weld zone K. The boundary portion K (the weld zone K) is an area including a part of the case lid 113 near its boundary with the case body 111 and a part of the case body 111 near its boundary with the case lid 113. The boundary portion K is formed in the upper surface 110a of the battery case 110 as shown in FIG. 8. In the battery 100 in the present embodiment, the case lid 113 and the case body 111 are joined by vertical-shooting case-sealing welding performed by irradiation of a CW laser (Continuous wave laser) from above the battery case 110 toward the boundary portion K formed in the upper surface 110a of the battery case 110.

Figure 10:
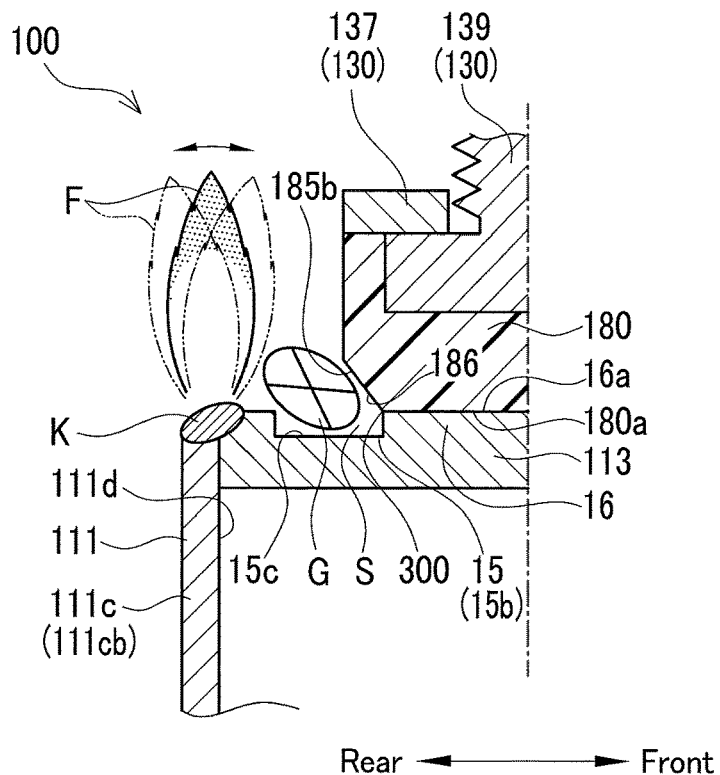
FIG. 10 is a diagram showing a process of welding a case lid and a case body in the first embodiment.

In the case of the vertical-shooting case-sealing welding, a plume F will rise upward from the boundary portion K as shown in FIG. 10. The plume F is metal vapor rising like fume and is mainly composed of Ar (Argon) vapor and plasma. In this vertical-shooting case-sealing welding using the CW laser, the shield gas G is caused to flow in the right-left direction between the plume F and the electrode terminal member (the positive terminal member 130, the negative terminal member 140) as shown in FIG. 8 in order to prevent the plume F from largely fluctuation (from greatly becoming disturbed) in the short side direction (the rear-front direction) of the case lid 113. This is because generating such a flow of the shield gas G as to cause the plume F to rise along the nearly vertical surface (i.e., to prevent the plume F from largely fluctuating in the rear-front direction in FIG. 10) around the plume F, it can prevent the plume F from damaging the electrode terminal member (the positive terminal member 130, the negative terminal member 140) and the second insulating member 180.

Figure 17:
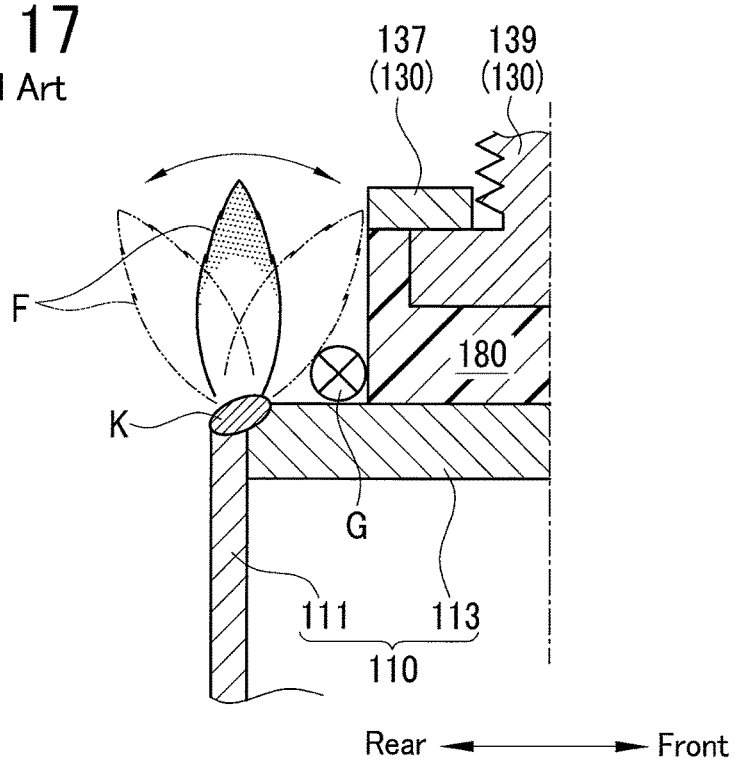
FIG. 17 is a diagram showing a process of welding a case lid and a case body in a related art.

However, if a sufficient amount of shield gas G is not allowed to flow between the plume F and the electrode terminal member (the positive terminal member 130, the negative terminal member 140), the plume F is likely to largely fluctuate (become largely disturbed) in the short direction (the rear-front direction) of the case lid 113 as in a related art shown in FIG. 17. Such large fluctuation of the plume F causes a problem that the second insulating member 180 is burned.

In the battery 100 in the first embodiment, therefore, the space S is formed by the case lid 113 and the second insulating member 180 as described above. The battery 100 in the first embodiment provides a larger cross sectional area of a flow path of the shield gas G by the space S as shown in FIG. 10 than that in the battery in the related art shown in FIG. 17. Accordingly, the battery 100 in the first embodiment allows a larger amount of shield gas G to flow between the plume F and the electrode terminal member (the positive terminal member 130, the negative terminal member 140) than that in the battery in the related art. Specifically, it is possible to cause the shield gas G of an amount sufficient to reduce fluctuation of the plume F to flow between the plume F and the electrode terminal member (the positive terminal member 130, the negative terminal member 140). This can prevent damages to the electrode terminal member (the positive terminal member 130, the negative terminal member 140) and the second insulating member 180.

The conventional battery shown in FIG. 17 is a battery different from the battery 100 in the first embodiment in that no recess 15 is formed in the case lid 113 and no escape section 186 is formed in the second insulating member 180. The conventional battery also uses a gas composed mostly of Ar (Argon) as the shield gas G to be fed during welding, for example.

After the case lid 113 and the case body 111 are joined to each other by laser welding, the electrolyte is poured into the case body 111 through the liquid inlet 113n of the case lid 113 so that the electrolyte is impregnated in the electrode body 150. Subsequently, the liquid inlet 113n of the case lid 113 is sealed with the plug 113m. Thereafter, through a predetermined process, the battery 100 (see FIG. 1) in the first embodiment is completed.

4. Operations and Effects in the First Embodiment

As explained above in detail, the battery 100 in the first embodiment is provided with the electrode body 150 (the power generating element), the case body 111 having the opening 111d on the upper side and enclosing the electrode body 150, the case lid 113 closing the opening 111d of the case body 111, the electrode terminal members (the positive terminal member 130, the negative terminal member 140) electrically connected to the electrode body 150 inside the case body 111 and extending out of the case lid 113, and the second insulating members 180 (the outer insulating member) placed on the case lid 113 to insulate between the electrode terminal members 130 and 140 and the case lid 113. The case lid 113 is fitted in the opening 111d and welded to the case body 111 by a laser beam irradiated from above the case lid 113 toward the boundary portion K formed in the upper surface 110a of the battery case 110 between the case lid 113 and the case body 111. Furthermore, this battery 100 is provided with a plume restricting zone 300 for preventing the plume F that rises from the boundary portion K during welding from rising toward the second insulating member 180. In the battery 100 in the first embodiment, the space S defined by the case lid 113 and the second insulating member 180 constitutes the plume restricting zone 300.

In detail, in the battery 100 in the first embodiment, the opening 111d has a rectangular shape defined by a pair of the long side portions 10 and a pair of the short side portions 11. The case lid 113 and the second insulating member 180 (the outer insulating member) are configured to form the space S along each long side portion 10 so that the space S extends more inward than the upper part (the vertical surface 185a) of the outer-peripheral side surface 185 of the second insulating member 180, the outer-peripheral side surface 185 extending along the long side portion 10. This space S constitutes the plume restricting zone 300. In other words, in the battery 100 in the first embodiment, the case lid 113 and the second insulating member 180 (the outer insulating member) forms the space S extending more inward than the upper part (the vertical surface 185a) of the outer-peripheral side surface 185 along the long side portion 10 in the second insulating member 180 and extending along the long side portion 10. The plume restricting zone 300 is provided by the space S. It also can be said that part of the case lid 113 and part of the second insulating member 180 that generate the space S constitute the plume restricting zone 300.

According to the battery 100 configured as above in the first embodiment, the space S generated by the case lid 113 and the second insulating member 180 can be utilized as a flow path of the shield gas G. Thus, the flow path of the shield gas G can be achieved with a larger cross sectional area than in the conventional battery shown in FIG. 17. Accordingly, a sufficient amount of the shield gas G is allowed to flow along the long side portions 10 of the case body 111. This shield gas G allowed to flow at a sufficient amount can reduce fluctuation of the plume F in the inside-outside direction, thereby preventing the plume F from rising toward the second insulating member 180 (i.e., the plume F from coming near the second insulating member 180). During welding of the case lid 113 to the case body 111, therefore, the second insulating member 180 can be prevented from being burned. Thus, the second insulating member 180 can maintain its insulation property.

In the battery 100 in the first embodiment, the space S formed by the case lid 113 and the second insulating member 180 (the outer insulating member) is recessed more downward than the upper surface 17a of the outer peripheral edge portion 17 of the case lid 113. Specifically, the case lid 113 is formed with the recesses 15, which also contribute to formation of the spaces S.

In the battery 100 in the first embodiment, therefore, the space S utilizable as the flow path of the shield gas G can be formed larger than in a battery formed with no recess 15. Accordingly, the shield gas G is allowed to flow more than in the absence of the recess 15, thereby reducing fluctuation of the plume F in the rear-front direction (the inside-outside direction of the case lid 113). This can more reliably prevent the plume F from rising up, or deflecting, toward the second insulating member 180.

If the battery case 110 is designed with a larger size to increase the separation distance (see L2 in FIG. 9) between the side wall 111c and the second insulating member 180, the flow path of the shield gas G is made larger in cross sectional area, whereas the width of the battery case 110 in the rear-front direction is increased disadvantageously. If the second insulating member 180 is designed with a smaller size to increase the separation distance between the side wall 111c and the second insulating member 180, an insulation distance may not be ensured. In contrast, the battery 100 in the first embodiment can prevent the second insulating member 180 from being burned by the plume F without increasing the width of the battery case 110 in the rear-front direction and without deteriorating the insulating function of the second insulating member 180.

The battery 100 in the present embodiment can be mounted in vehicles that use electrical energy supplied by this battery 100 for part or all of their power sources. The vehicles include, for example, electric cars, hybrid cars, plug-in hybrid cars, hybrid railway vehicles, fork lifts, electric wheelchairs, electric bicycles, electric scooters.

5. Modified Example

Figure 11:
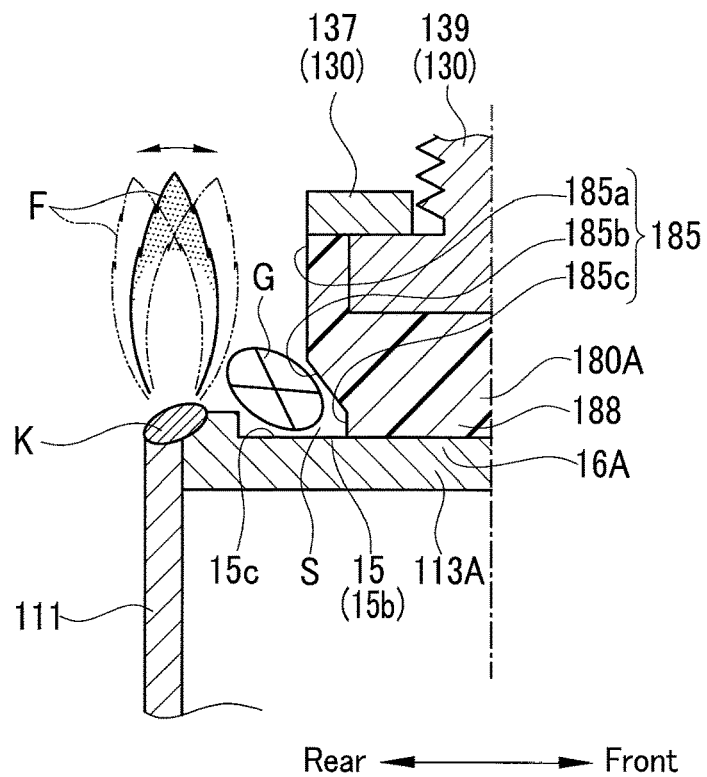
FIG. 11 is a diagram showing a modified example of the battery in the first embodiment.

A modified example of the battery 100 in the first embodiment will be explained below. The battery 100 in the first embodiment is configured as shown in FIG. 10 that the second insulating member 180 is shaped so that the lower edge of the rear inclined surface portion 185b and the lower edge of the front inclined surface portion 185b are continuous through a horizontal surface (a bottom surface 180a), and this bottom surface 180a is placed on the upper surface 16a of the mounting area 16 of the case lid 113. This upper surface 16a of the mounting area 16 is positioned above the bottom surface 15c of the recess 15. As an alternative, the second insulating member 180 and the case lid 113 may be configured as a second insulating member 180A and a case lid 113A shown in FIG. 11. The second insulating member 180A shown in FIG. 11 is provided with a protrusion 188 protruding more downward than the lower edge of the inclined surface portion 185b. In other words, the side surface 185 extending in the longitudinal direction of the second insulating member 180A consists of a vertical surface portion 185a (referred as a first vertical surface portion 185a), an inclined surface portion 185b continuous with the first vertical surface portion 185a, and a second vertical surface portion 185c vertically extending from the lower edge of the inclined surface portion 185b to be continuous with the inclined surface portion 185b. A mounting area 16A of the case lid 113A is formed to be flush with the bottom surface 15c of the recess 15 without protruding upward more than the bottom surface 15c of the recess 15. This configuration can also generate the space S as in the battery 100 in the first embodiment and thus can provide the same advantageous effects as with the battery 100 in the first embodiment. Specifically, the battery according to the present invention has only to include the space S formed by the case lid 113 and the second insulating member 180. Thus, the shapes of the case lid 113 and the second insulating member 180 are not limited to those shown in FIG. 10.

In the battery 100 in the first embodiment, the space S is provided as the space defined by a combination of the space S1 recessed more downward than the upper surface 17a of the outer peripheral edge portion 17 in the case lid 113 and the space S2 formed by the case lid 113 and the escape section 186 (the inclined surface portion 185b) formed in the second insulating member 180 (see FIG. 9). As an alternative, the space S may be provided by only the space S2 formed by the case lid 113 and the escape section 186 (the inclined surface portion 185b) formed in the second insulating member 180. This configuration is smaller in cross sectional area of a flow path of shield gas G than in the battery 100 in the first embodiment because of the absence of the recess 15 in the case lid 113 (because of the absence of the space S1); however, it is larger in cross sectional area of a flow path of the shield gas G than in the related art (see FIG. 17) because of the presence of the escape section 186 (because of the presence of the space S2). Therefore, this configuration allows the shield gas G to flow more than in the related art, thereby enabling reducing fluctuation of the plume F.

Second Embodiment

A battery 200 in a second embodiment will be explained referring to FIGS. 12 to 16 and 18. The battery 200 in the second embodiment, which is characterized in the shape of the case body 111, is different from the battery 100 in the first embodiment in the shapes of the case body 111 and the case lid 113. In the battery 200 in the second embodiment, the second insulating member 180 is formed with no escape section 186 and the case lid 113 is formed with no recess 15. That is, the battery 200 in the second embodiment includes no space S. Other structure of the battery 200 than the above is identical or similar to that of the battery 100 in the first embodiment. In the following explanation of the battery 200 in the second embodiment, identical or similar parts to those in the battery 100 in the first embodiment will be given the same reference signs as those in the battery 100 in the first embodiment and their explanations are omitted.

Figure 12:
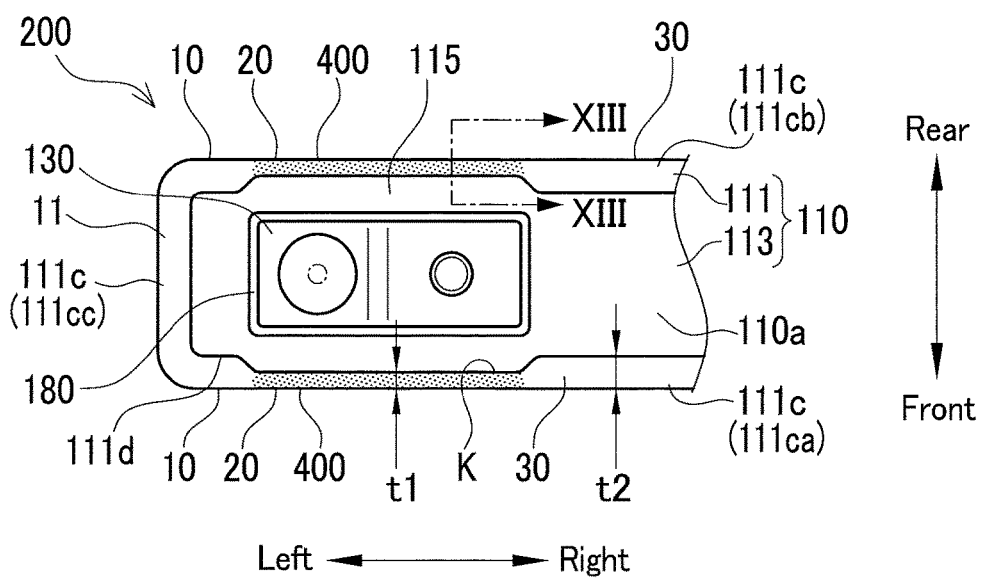
FIG. 12 is a top view of a main part of a battery in a second embodiment.
Figure 13:
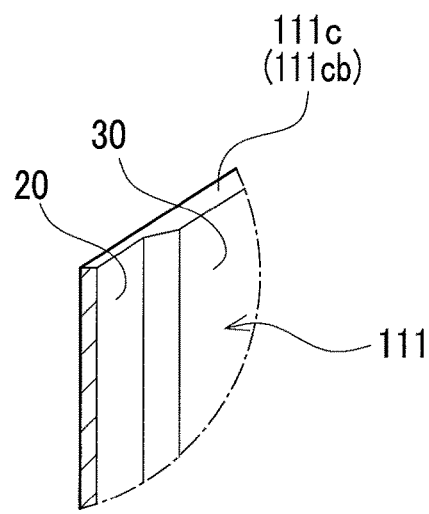
FIG. 13 is a perspective view of a case body in a section taken along XIII-XIII in FIG. 12.

FIG. 12 is a plan view of a part of the battery 200 on the positive terminal member 30 side in the second embodiment. FIG. 13 is a perspective view of the case body 111 with a cross section taken along XIII-XIII in FIG. 12. As shown in FIGS. 12 and 13, the battery 200 in the second embodiment is formed with a thin wall portion 20 in a front wall 111ca of the case body 111. The thin wall portion 20 is a portion having a thinner thickness in the inside-outside direction of the battery case than other portions of the battery case. That is, the thickness t1 of the thin wall portion 20 (see FIG. 12) is thinner than the thickness t2 of a remaining portion (hereinafter, also referred to as a "normal portion" 30) other than the thin wall portion 20 in the front wall 111ca. This thin wall portion 20 is formed with the thickness t1 uniform from the upper end to the lower end as partly shown in the perspective view in FIG. 13. In the case body 111 in the first embodiment, the thickness (see L3 in FIG. 9) of the side wall 111c is t2 equal to the thickness of the normal portion 30 in the second embodiment.

The thin wall portion 20 in the second embodiment are formed in a whole area (a shaded part in FIG. 12) aligned with the second insulating member 180 in the rear-front direction in plan view while the terminal-attached lid member 115 is combined with the case body 111. Specifically, the length of the thin wall portion 20 in the right-left direction is almost equal to the length of the second insulating member 180 in the right-left direction. On the other hand, another thin wall portion 20 is formed in the rear wall 111cb as in the front wall 111ca. This thin wall portion 20 of the rear wall 111cb is formed in a position opposite to the thin wall portion 20 of the front wall 111ca. In other words, in the assembly of the terminal-attached lid member 115 and the case body 111, the second insulating member 180 is located between the thin wall portion 20 of the front wall 111ca and the thin wall portion 20 of the rear wall 111cb in plan view. It is to be noted that FIG. 12 illustrates only the part of the battery 200 on the positive terminal member 130 side, but thin wall portions 20 are also formed in a part of the battery 200 on the negative terminal member 140 side in a similar manner on the positive terminal member 130 side.

The case lid 113 in the second embodiment has a shape having outward protruding side portions conforming to the shape of the case body 111 formed with the thin wall portions 20 as above so as to engage with the upper part of each thin wall portion 20 of the case body 111. As shown in FIG. 12, specifically, the case lid 113 is shaped to be almost fittable without gap with respect to the opening 111d of the case body 111.

Of the process of manufacturing the battery 200 in the second embodiment configured as above, a step of welding the terminal-attached lid member 115 to the case body 111 will be explained below. An area to be joined by welding is a boundary portion (a weld zone), indicted by an alphabet K in FIG. 12, between the case lid 113 and the case body 111. The boundary portion K (the weld zone K) is an area including a part of the case lid 113 near its boundary with the case body 111 and a part of the case body 111 near its boundary with the case lid 113. In the battery 200 in the second embodiment, similarly to the battery 100 in the first embodiment, the case lid 113 and the case body 111 are joined by vertical-shooting case-sealing welding performed by irradiation of a CW laser (Continuous wave laser) from above the battery case 110 toward the boundary portion K formed in the upper surface 110a of the battery case 110.

Figure 14:
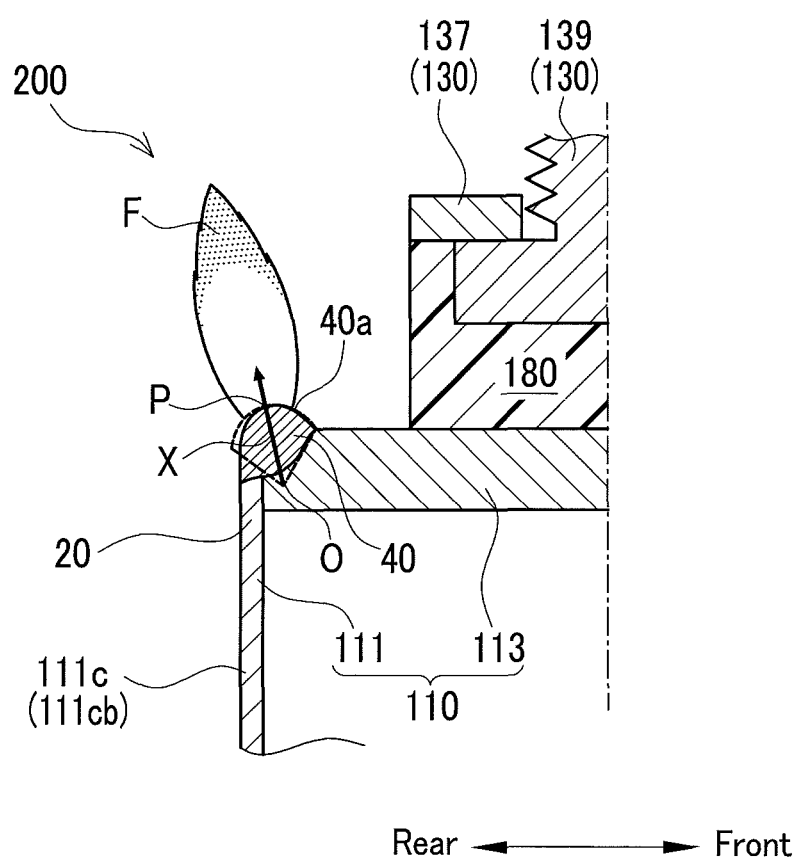
FIG. 14 is a diagram showing a process of welding a case lid and a case body in the second embodiment.

As also explained in the first embodiment, in the case of the vertical-shooting case-sealing welding, a plume F will rise upward from the boundary portion K (see FIG. 14). Herein, the rising direction of the plume F substantially coincides with the direction of a straight line X in a cross section along the rear-front direction as shown in FIG. 14, the line X being determined in such a manner that an upper surface 40a of a weld bead 40 generated by welding is approximated to a circular arc and further the center (see an alphabet O in FIG. 14) of a sector, or a fan shape, defined by the circular arc is joined to a center point (see an alphabet P in FIG. 14) of the circular arc of the sector.

In the battery 200 in the second embodiment, since a heat capacity of each thin wall portion 20 is lower than a heat capacity of the remaining portions (the normal portions 30) other than the thin wall portions 20, the thin wall portions 20 are melted well during welding thereof. In each thin wall portion 20, accordingly, the weld bead 40 is formed extending over the outside surface of the case body 111. This tilts the straight line X joining the points O and P toward the outside of the battery case 110 with respect to the vertical direction. To be specific, the plume F rises in an orientation tilting toward the outside of the battery case 110. This means that the plume F rises in a direction separating away from the electrode terminal member (the positive terminal member 130, the negative terminal member 140) and the second insulating member 180. Accordingly, in the battery 200 in the second embodiment including the thin wall portions 20, it is possible to prevent the electrode terminal member (the positive terminal member 130, the negative terminal member 140) and the second insulating member 180 from being damaged by the plume F.

Figure 18:
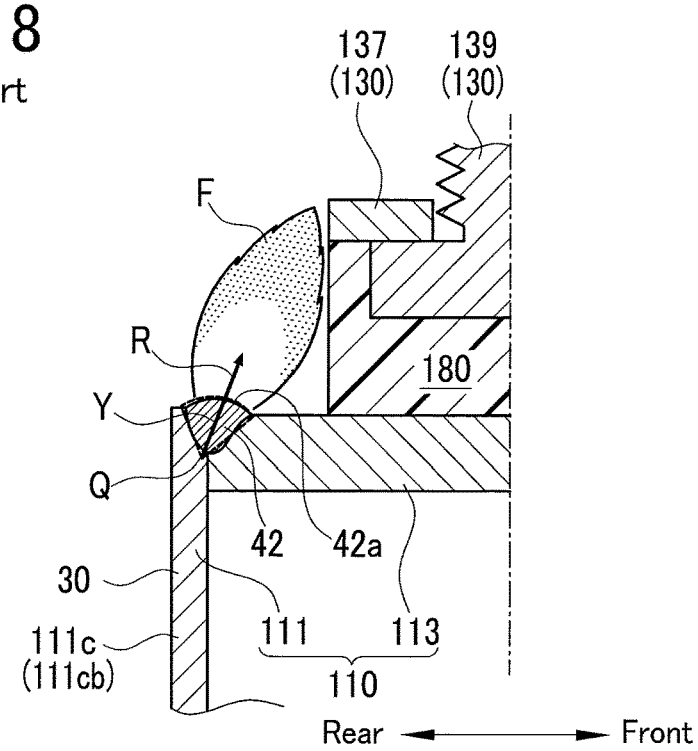
FIG. 18 is a diagram showing a process of welding a case lid and a case body in another related art.

In the absence of the thin wall portions 20, the plume F will rise up as shown in FIG. 18. A battery in a related art shown in FIG. 18 is not formed with the thin wall portions 20 in the case body 111. In other words, in the battery shown in FIG. 18, the thickness of the side wall 111c of the case body 111 is equal to the thickness t2 of the normal portion 30 of the front wall 111ca shown in FIG. 14. When these case body 111 and case lid 113 are to be welded, a weld bead 42 is formed in a shape not extending over the outside surface of the case body 111 as shown in FIG. 18. This is because the normal portion 30 is larger in heat capacity than the thin wall portion 20 and hence is hard to melt. It is to be noted that the power of the laser for welding of the battery 200 in the second embodiment is set at a level enough to form a weld bead as shown in FIG. 18 during welding of the normal portion 30. In the battery 200 in the second embodiment, the entire circumference of the boundary portion K is welded with this laser power.

When the aforementioned weld bead 42 is to be formed, a straight line Y determined in such a manner that the upper surface 42a of the weld bead 42 is approximated to a circular arc as shown in FIG. 18 and further the center (see an alphabet Q in FIG. 18) of a sector, or a fan shape, defined by the circular arc is joined to a center point (see an alphabet R in FIG. 18) of the circular arc of the sector tilts toward the inside of the battery case 110. To be specific, the plume F will rise in a tilting direction toward the inside of the battery case 110. This means that the plume F rise in a direction coming close to the electrode terminal member (the positive terminal member 130, the negative terminal member 140) and the second insulating member 180. In the battery in the related art including no thin wall portion 20, therefore, the electrode terminal member (the positive terminal member 130, the negative terminal member 140) and the second insulating member 180 would be burned by the plume F.

In the battery 200 in the second embodiment, as explained above in detail, the opening 111d has a rectangular shape defined by a pair of the long side portions 10 and a pair of the short side portions 11. The case body 111 includes a pair of the first side walls (the front wall 111ca and the rear wall 111cb) having the long side portions 10 and a pair of the second side walls (the left wall 111cc and the right wall 111do (see FIG. 1) having the short side portions 11. The portions (see the shaped areas in FIG. 12) of the front wall 111ca and the rear wall 111cb between which the second insulating member 180 (the outer insulating member) is interposed are formed as the thin wall portions 20 thinner in thickness than the remaining portions (the normal portions 30). In the second embodiment, each thin wall portion 20 constitutes a plume restricting zone 400.

Accordingly, since the heat capacity of each thin wall portion 20 in the first side walls (the front wall 111ca and the rear wall 111cb) is lower than the heat capacity of the remaining portions (the normal portions 30), each thin wall portion 20 melts more than the normal portions 30. In each thin wall portion 20, therefore, the weld bead 40 is formed more downward than in the case lid 113 because the weld zone K (the boundary portion K) of the case body 111 melts more than the weld zone K of the case lid 113. In a vertical cross section along the short side portion 11, the straight line X joining the center point P of the circular arc of the upper surface 40a of the weld bead 40 and the center O of the sector defined by the circular arc tilts toward the outside of the battery case 110 with respect to the vertical direction. Herein, it is known that the plume F rises along the straight line X. When the straight line X tilts toward the outside of the battery case 110 with respect to the vertical direction as above, the plume F will rise in an orientation tilting toward the outside of the case body 111. Thus, it is possible to direct the plume F away from (i.e., to separate the plume F from) the second insulating member 180 placed on the case lid 113. In other words, the plume F can be prevented from rising toward the second insulating member 180. This can prevent the second insulating member 180 from being burned and thus prevent deterioration in the insulating property of the second insulating member 180.

Figure 15:
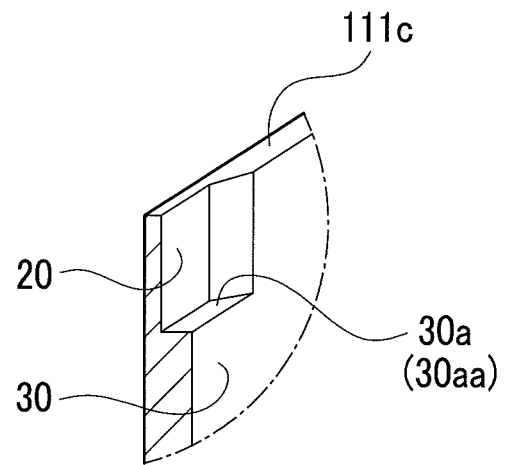
FIG. 15 is a diagram showing a modified example of the battery in the second embodiment.

In the second embodiment, each thin wall portion 20 is formed with the same thickness t1 (see FIG. 12) from the upper end to the lower end of the side wall 111c. As an alternative, only an upper part of the side wall 111c may be formed with a thin wall portion 20 with the thickness t1 as shown in FIG. 15. In this case, the upper part of the side wall 111c to be melted during welding has a low heat capacity by the thinned wall and thus is melted well. This can provide the same effects as the battery 200 in the second embodiment. Moreover, this configuration including the smaller thin wall portion 20 can provide higher strength of the case body 111 than the configuration including the thin wall portion 20 formed from the upper end to the lower end of the side wall 111c.

Figure 16:
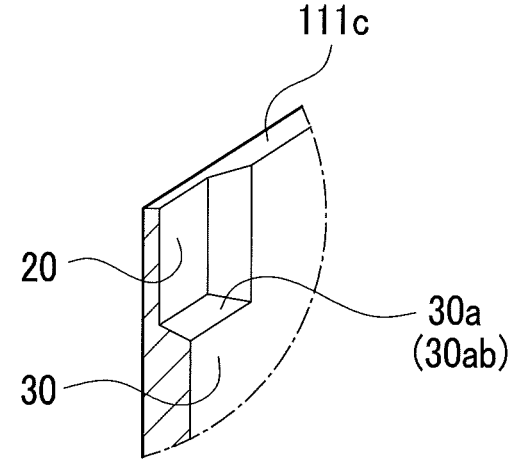
FIG. 16 is a diagram showing another modified example of the battery in the second embodiment.

In the case where the thin wall portion 20 with the thickness t1 is formed in only the upper part of the side wall 111, an upper surface 30a of a remaining portion (a normal portion 30) other than the thin wall portion 20, located under the thin wall portion 20, may be formed as a horizontal surface 30aa extending in a horizontal direction as shown in FIG. 15 or as an inclined surface 30ab inclining obliquely downward from outside to inside of the case as shown in FIG. 16.

In the second embodiment, each of the front wall 111*ca* and the rear wall 111*cb* of the side wall 111*c* is provided with the thin wall portions 20 having the thickness t1 and the remaining portions (the normal portions 30) other than the thin wall portions 20 and having the thickness t2. However, the thin wall portion(s) 20 may be provided in any place in the case body 111 as long as the thickness of the side wall 111*c* located around the second insulating member 180 can be made with the thickness t1 of the thin wall portion 20 of the second embodiment without changing the width of the battery case 110 in the rear-front direction.

For instance, the thickness of each of the front wall 111*ca* and the rear wall 111*cb* may be set to t1 over the entire area in the right-left direction. Specifically, the entire area in the right-left direction of each of the front wall 111*ca* and the rear wall 111*cb* may be formed as the thin wall portion 20. In this case, the thickness of each of the left wall 111*cc* and the right wall 111*cd* is set to t2 as with the normal portions 30 in the second embodiment.

As another alternative, the front wall 111*ca* and the rear wall 111*cb* may be each provided with the thin wall portion 20 having the thickness t1 and the portion (the normal portion 30) excepting the thin wall portion 20 and having the thickness t2. Also, the left wall 111*cc* and the right wall 111*cd* may be each designed with a thickness t1 equal to the thickness of the thin wall portion 20. In this case, it is preferable that the thin wall portions 20 of the front wall 111*ca*, the left wall 111*cc*, and the rear wall 111*cb* surrounding the positive terminal member 130 are continuous with each other with the same thickness t1, while the thin wall portions 20 of the front wall 111*ca*, the right wall 111*cd*, and the rear wall 111*cb* surrounding the negative terminal member 140 are continuous with each other with the same thickness t1. As shown in FIG. 12, since the left wall 111*cc* (the right wall 111*cd*) is located close to the second insulating member 180, the above configuration can prevent the occurrence of a defect that the plume F burns the second insulating member 180 during welding of the left wall 111*cc* (the right wall 111*cd*).

Furthermore, the side wall 111*cc* (front wall 111*ca*, rear wall 111*cb*, left wall 111*cc*, and right wall 111*cd*) may be designed with the thickness t1 over the entire area. Specifically, the entire area of the side wall 111*c* (front wall 111*ca*, rear wall 111*cb*, left wall 111*cc*, and right wall 111*cd*) may be formed as the thin wall portion 20. In this case, it is preferable that the left wall 111*cc* and the right wall 111*cd* each having the short side portion 11 are provided with the thin wall portions 20 in only the upper part of the side wall 111*c* (see FIGS. 15 and 16). With this configuration, the thin wall portions 20 may be formed in the left wall 111*cc* and the right wall 111*cd* even when a processing method such as deep-drawing, difficult to reduce the thickness of the entire area of the left wall 111*cc* and the right wall 111*cd*.

Other Modified Examples

The present invention is explained above in the embodiment, but is not limited thereto. The present invention may be embodied in other specific forms without departing from the essential characteristics thereof. For instance, if only the electrode terminal member (the positive terminal member 130, the negative terminal member 140) is electrically connected to the electrode body 150 inside the case body 111 and extends out of the case lid 113, the electrode terminal member (the positive terminal member 130, the negative terminal member 140) does not necessarily include the positive connecting member 135 (the negative connecting member 145), the positive outer terminal member 137 (the negative outer terminal member 147), and the positive fastening member 139 (the negative fastening member 149).

In the above embodiment, the vertical-shooting case-sealing welding uses the CW laser. As an alternative, a pulse laser may be used. The laser to be used for welding may be selected from various types; a YAG laser, a carbon dioxide laser, an excimer laser, and so on. The welding speed, the kind of the shield gas G, and other conditions have only to be appropriately selected according to welding design.

Although the above embodiment exemplifies the lithium ion secondary battery 100 as the battery, the technical concept of the present invention is applicable to other types of secondary batteries such as a nickel-metal hydride battery and a nickel cadmium battery. Further, the above embodiment exemplifies the battery 100 including the wound power generating element (the electrode body 150). As an alternative, the technical concept of the present invention is applicable to a battery having a laminated power generating element and other type batteries. Other than the battery 100 having the rectangular battery case 110 shown in the above embodiment, the technical concept of the present invention is also applicable to a battery having a cylindrical battery case and others.

In the first embodiment, the space S constitutes the plume restricting zone 300. In the second embodiment, the thin wall portion(s) 20 constitutes the plume restricting zone 400.

REFERENCE SIGNS LIST

10 Long-side portion
11 Short-side portion
17 Outer peripheral edge portion
17*a* Upper surface
20 Thin wall portion
100 Battery
111 Case body
111*ca* Front wall (First side wall)
111*cb* Rear wall (First side wall)
111*cc* Left wall (Second side wall)
111*cd* Right wall (Second side wall)
111*d* Opening
113 Case lid
130 Positive terminal member (Electrode terminal member)
140 Negative terminal member (Electrode terminal member)
150 Electrode body (Power generating element)
180 Second insulating member (Insulator, Outer insulating member)
185 Outer-peripheral side surface
185*a* Vertical surface
185*b* Inclined surface portion
K Boundary portion
S Space

The invention claimed is:
1. A battery including:
a power generating element;
a case body having an upper opening and housing the power generating element;
a case lid closing the opening of the case body;
an electrode terminal member electrically connected to the power generating element inside the case body and extending out of the case lid; and
an outer insulating member placed on the case lid and configured to insulate between the electrode terminal member and the case lid, the case lid being fitted in the opening and welded to the case body by laser irradiation from above the case lid toward a boundary portion between the case lid and the case body, wherein the battery further includes a plume restricting zone configured to prevent a plume which rises from the boundary portion during welding from rising toward the outer insulating member, the opening has a rectangular shape including a pair of long side portions and a pair of short side portions, the outer insulating member is provided with an outer-peripheral side surface including an upper part having a vertical surface portion extending in a vertical direction and a lower part having an inclined surface portion inclining inward from the vertical surface portion, an inner portion of a recess formed in the case lid, a space is formed between the recess and the inclined surface portion of the outer insulating member, and the space includes a space S1 recessed lower than an upper surface of an outer peripheral edge portion of the case lid and a space S2 formed between the case lid and the inclined surface portion and recessed more inward than the upper part of the outer-peripheral side surface extending in the longitudinal direction of the outer insulating member, the space constitutes the plume restricting zone, and the space is formed so as to provide a flow path for a shield gas during welding, and the battery provides a larger cross sectional area for the flow path of the shield gas with the space.

* * * * *